United States Patent [19]

Hirose

[11] 4,426,136
[45] Jan. 17, 1984

[54] PROJECTION LENS WITH LONG WORKING DISTANCE

[75] Inventor: Hideo Hirose, Tokyo, Japan
[73] Assignee: Nippon Kogaku K.K., Tokyo, Japan
[21] Appl. No.: 260,775
[22] Filed: May 5, 1981
[30] Foreign Application Priority Data May 16, 1980 [JP] Japan .................... 55-64050

[51] Int. Cl.³ .................... G02B 9/62; G02B 9/64
[52] U.S. Cl. .................... 350/463; 350/464
[58] Field of Search ............ 350/463, 464, 465, 454, 350/455

[56] References Cited

FOREIGN PATENT DOCUMENTS 47-44810 11/1972 Japan .................... 350/463

Primary Examiner—John K. Corbin
Assistant Examiner—P. M. Dzierzynski
Attorney, Agent, or Firm—Shapiro and Shapiro

[57] ABSTRACT

A projection lens with a long working distance for projecting a magnified image of an object comprises, in the order from the image side, a diverging first lens group containing a positive lens element and a negative lens element, a diverging second lens group having a negative meniscus lens element with a convex surface thereof facing toward the image side, a converging third lens group containing a positive meniscus lens element whose concave surface faces toward the image side, a converging fourth lens group having a positive lens composed of mutually cemented negative lens element and positive lens element, and a converging fifth lens group. The projection lens of an elevated magnification has a working distance from twice to five times longer than the focal length and is bright with a limited number of lens components.

20 Claims, 8 Drawing Figures

PROJECTION LENS WITH LONG WORKING DISTANCE

BACKGROUND OF THE INVENTION

1. Field of the Invention

The present invention relates to a projection lens for obtaining a magnified projection image of an object to be inspected, and more particularly to such a lens with an elevated, i.e., high magnification.

2. Description of the Prior Art

A projection lens of elevated magnification generally has a very short focal length and therefore has a short working distance that is inadequate for manipulation. Particularly where the object to be inspected has deep surface irregularities, such lens not only inhibits the free displacement of the object but also does not allow observation of the recessed portion.

SUMMARY OF THE INVENTION

The object of the present invention is to provide a projection lens system of an elevated magnification having a working distance twice to five times longer than the focal length and, which is bright, and which has a limited number of lens components.

As will be shown in FIGS. 1 to 4 representing various embodiments, the projection lens system of the present invention comprises, in the order from the image side, of a diverging first lens means comprising a first lens group G1 having a positive lens component and a negative lens component, a diverging second lens means comprising a second lens group G2 having a negative meniscus lens component with its convex surface thereof facing toward the image side, a converging third lens means comprising a third lens group G3 having a positive meniscus lens component with concave surface thereof toward the image side, a converging fourth lens means comprising a fourth lens group G4 having a positive lens component composed of a negative lens and a positive lens mutually cemented with the cemented surface convex to the image side, and a converging fifth lens means comprising a fifth lens group G5 having a positive lens component, said lens system being so composed as to satisfy the following conditons:

$$0.6 \, K < f_3 < 1.3 \, K \quad (1)$$

wherein $k = |F_{12}| + d_6$ $$-3.5 < (r_8 + r_7)/(r_8 - r_7) < -0.8 \quad (2)$$

$$0.4 > n_9 - n_{10} > 0.1 \quad (3)$$

$$|f_1| > |f_2| \quad (4)$$

wherein $f_1$, $f_2$ and $f_3$ are focal lengths respectively of the first, second and third lens groups; $F_{12}$ the total focal length of the first and second lens groups; $d_6$ the air gap between the second and third lens groups; $n_9$ and $n_{10}$ the refractive indexes of the negative and positive lenses respectively of the fourth lens groups; and $r_7$ and $r_8$ the curvatures respectively of the image-side face the object-side face of the third lens group. (The term "group" is used herein to refer to both a plurality of lens elements as well as to a single lens element.)

A lens system with a long working distance can generally be obtained by a large total length lens with a large distance between the diverging group and the converging group or with a strongly diverging group. In case of obtaining a long working distance by increasing the distance between the diverging and converging groups, the longer distance reduces the powers of said groups and is therefore advantageous in correcting the aberrations but results in a significantly large total lens length that is inconvenient for assembly into an apparatus and for manipulation. In fact, in many applications such a lens is not acceptable because of a limitation on the total acceptable length of the lens. On the other hand, the use of a strongly diverging group allows the distance between the diverging and converging groups to be reduced and thus the entire lens to be compact, but requires a stronger power for the converging group, therefore giving rise to an enhanced ringed-spherical-aberration. Also the presence of the strongly diverging group leads to an excessively large negative Petzval's sum and enhanced spherical aberration at shorter wavelengths.

DESCRIPTION OF THE PREFERRED EMBODIMENTS

Now the present invention will be described in detail by the embodiments thereof, wherein the ray tracking is made from the image plane according to the designing principle thereof.

According to the present invention there are provided first and second diverging groups G1, G2 with an appropriate distance therebetween for obtaining a strong diverging power even with relatively modest refractive powers of said groups, thereby improving the Petzval's sum. Also in order to compensate for increased spherical aberration at shorter wavelengths by the diverging groups, the refractive power of the third group G3 is so selected, as represented by the condition (1), that the focal length $f_3$ of said third group G3 is substantially equal to the sum of the composite focal length $f_{12}$ of the first and second groups and of the distance $d_6$ between the second and third groups, or that the composite rear focal point of the first and second groups substantially coincides with the front focal point of the third group, whereby the strongly diverging beam emerging from the diverging groups is converted into a parallel or slightly converging beam. The steep change of beam inclination achieved by the third group G3 causes greater deficiency in the correction of spherical aberration at the longer wavelength than at the shorter wavelength, thereby compensating the spherical aberration enhanced at the shorter wavelength by the diverging groups. In this connection the condition (2) defining the lens shape in the third group causes refraction principally at the object-side face of the lens, thereby increasing said deficiency and thus enhancing the effect of the condition (1). A focal length exceeding the upper limit of the condition (1) increases the incident beam height into the fourth group, thereby rendering the correction of aberration therein difficult, while a focal length less than the lower limit is undesirable because of reduced working distance. In order to extend the working distance as far as possible, it is desirable to maintain the refractive power of the fourth group very low and to constitute the fifth group as a lens group or a single convex group the principal plane of which is positioned at the object side.

Figure 1:
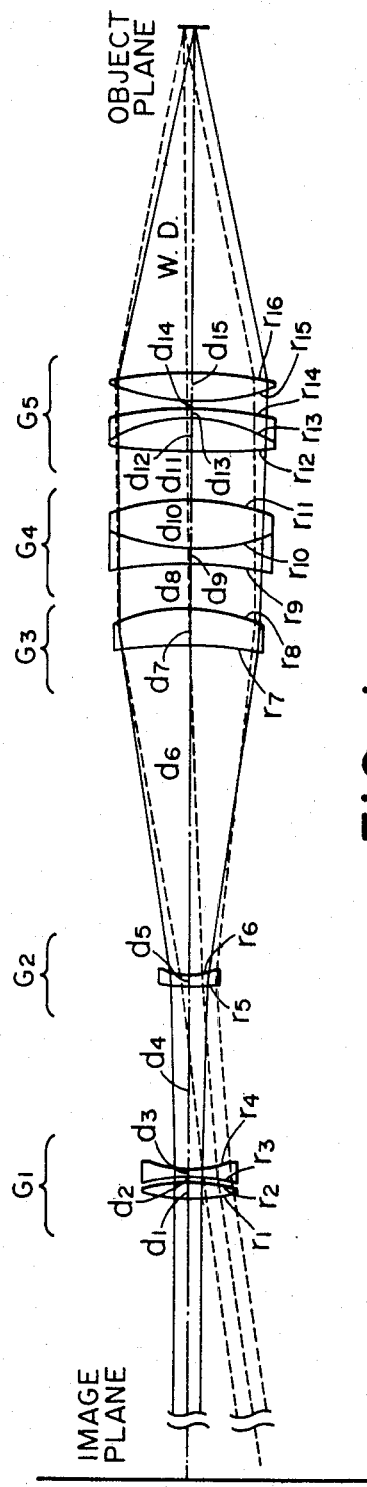
FIG. 1 is a schematic view of the first embodiment of a lens system of the present invention.

The spherical aberration, insufficiently corrected under the conditions (1) and (2) particularly at the shorter wavelength, can be satisfactorily compensated without deterioration thereof at the shorter wavelength by employing a strongly diverging adhereing face in the fourth group convex to the image side and satisfying the condition (3). Also the condition (3) improves the negative Petzval's sum. The lateral chromatic aberration in the present lens system has to be corrected by the appropriate glass selection for the convex and concave lenses in the diverging group, particularly in the first group G1 with a large incident beam height, since the principal ray passes through the approximate center of the converging groups as shown in FIG. 1 representing the first embodiment of the present invention. The Abbe numbers $\nu_1$ and $\nu_3$ of the convex and concave lenses, respectively, are preferably selected so as to satisfy the following condition: $50 > \nu_3 - \nu_1 > 15$.

In addition the distribution of refractive power between the first group G1 and second group G2 as defined by the condition (4) reduces the incident beam height into the second group G2, thereby enabling the second group to be constituted by a single lens despite of the relatively strong refractive power thereof. In general the distortion aberration has to be corrected to be very low in the projection testing equipment, and such correction in the present lens system has to be made principally in the first group G1 of the large incident beam height since the oblique principal ray passes through the approximate center of the converging groups G3, G4 and G5 as shown in FIG. 1. However, such correction of distortion aberration can be easily achieved by selecting appropriate bending for the convex and concave lenses constituting the first group since relatively low refractive powers are required for said lenses as long as the refractive power of said first group satisfies the condition (4). Also in case the first group G1 is composed of adhered lenses, such correction is achievable by selecting suitably different refractive indexes $n_1$, $n_3$ respectively for the convex and concave lenses mutually cemented to satisfy a condition $n_1 > n_3$.

In the present lens system, there are provided relatively large air gaps $d_4$, $d_6$ respectively between the first group G1 and second group G2 and between the second group G2 and third group G3 ($d_4$ and $d_6$ being much larger than the thickness, $d_5$, of the negative meniscus lens of the second group G2, as is evident in examples of the invention described later), wherein the latter gap $d_6$ is preferably selected to be larger than the former gap $d_4$.

In the following there will be explained several embodiments of the present invention.

The Example 1 shown in FIG. 1 has a working distance 5.38 times larger than the focal length, has a total length of 1560 mm and provides a projecting magnification of 100 X. In the present embodiment, the fifth group G5 is composed of three components, i.e., mutually cemented positive and negative lenses and a biconvex positive lens arranged in the order from the image side. In order to sufficiently extend the working distance the refractive power in the fifth groups is principally borne by said biconvex lens at the object side while said cemented lenses are designed to have practically no refractive power, and the adhering face thereof is designed as a diverging face to compensate for the deficient correction of spherical aberration caused by said biconvex lens at the object side.

Figure 2:
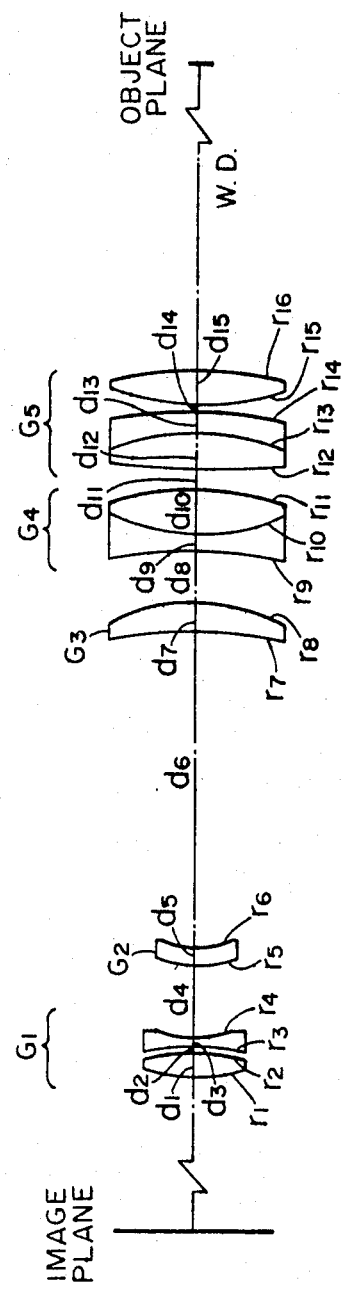
FIG. 2 is a schematic view of the second embodiment of a lens system of the present invention.

The Example 2 shown in FIG. 2 has a working distance 3.05 times larger than the focal length, has a total length of 1544 mm and provides a projecting magnification of 50 X. The principal difference from the first embodiment lies in a fact that the working distance is rendered somewhat shorter by the changes in the refractive powers of the first and second groups.

Figure 3:
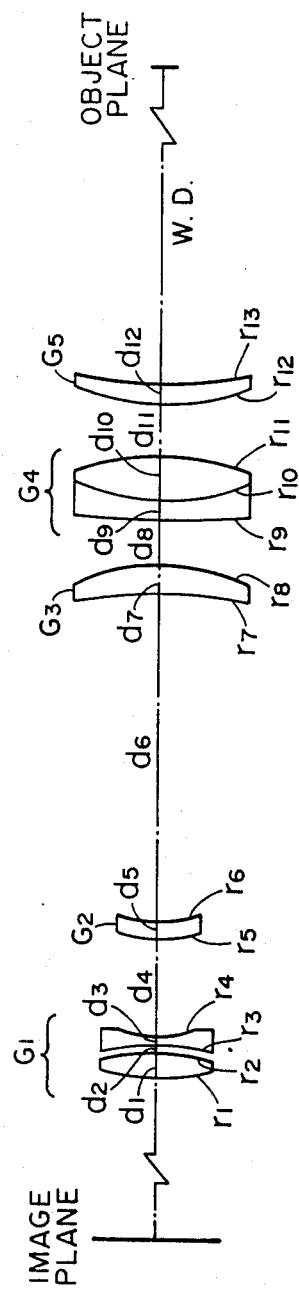
FIG. 3 is a schematic view of the third embodiment of a lens system of the present invention.

The Example 3 shown in FIG. 3 has a working distance 3.03 times larger than the focal length, has a total length of 1200 mm and provides a projecting magnification of 50 X. The fifth group G5, though composed of a convex meniscus lens, provides sufficient corrections for chromatic and spherical aberrations because of the relatively short total length.

Figure 4:
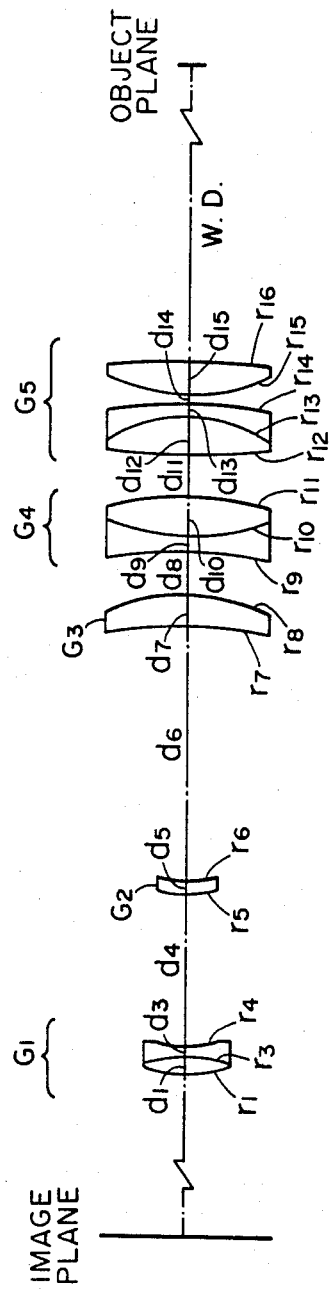
FIG. 4 is a schematic view of the fourth embodiment of a lens system of the present invention.
Figure 5:
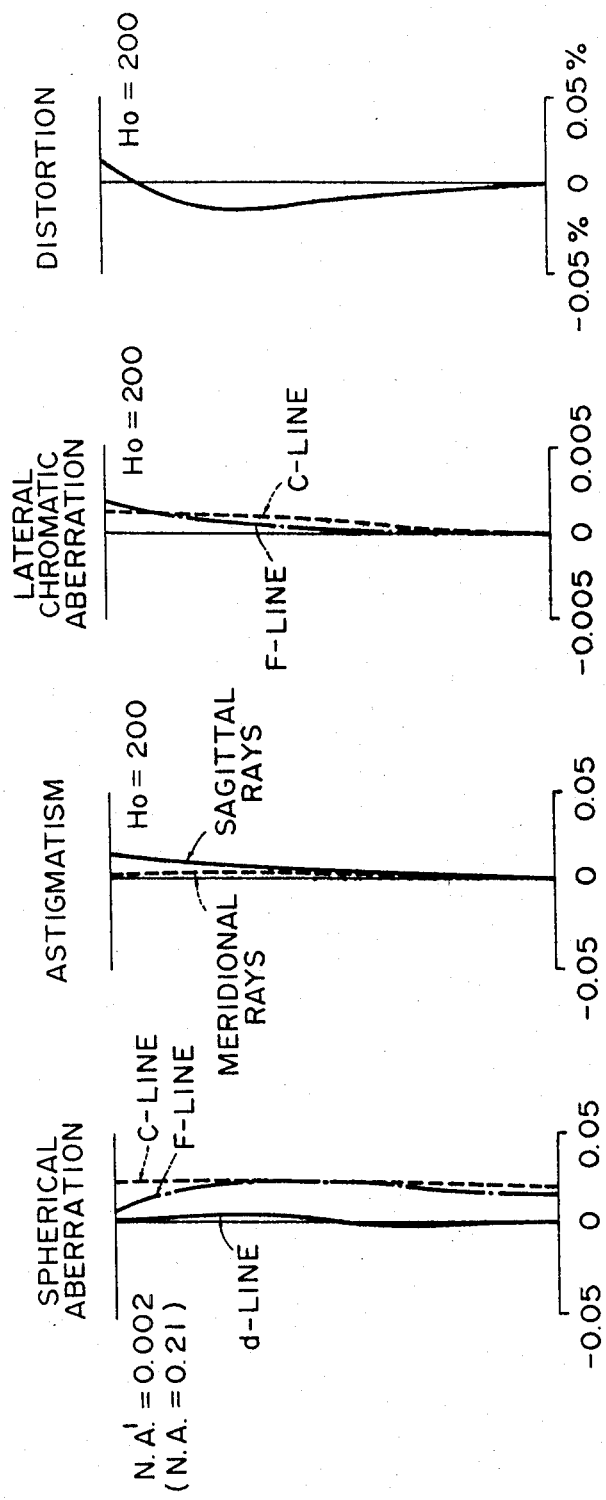
FIG. 5 is an aberration chart of the first embodiment shown in FIG. 1.
Figure 6:
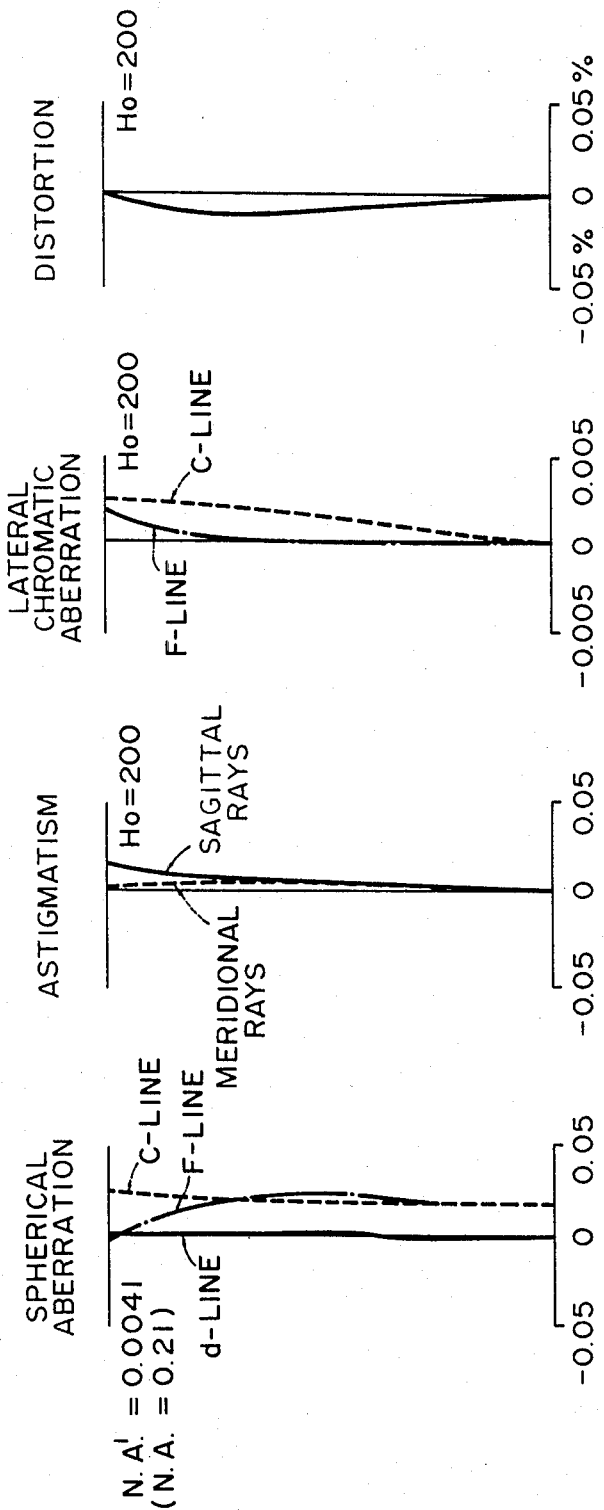
FIG. 6 is an aberration chart of the second embodiment shown in FIG. 2.
Figure 7:
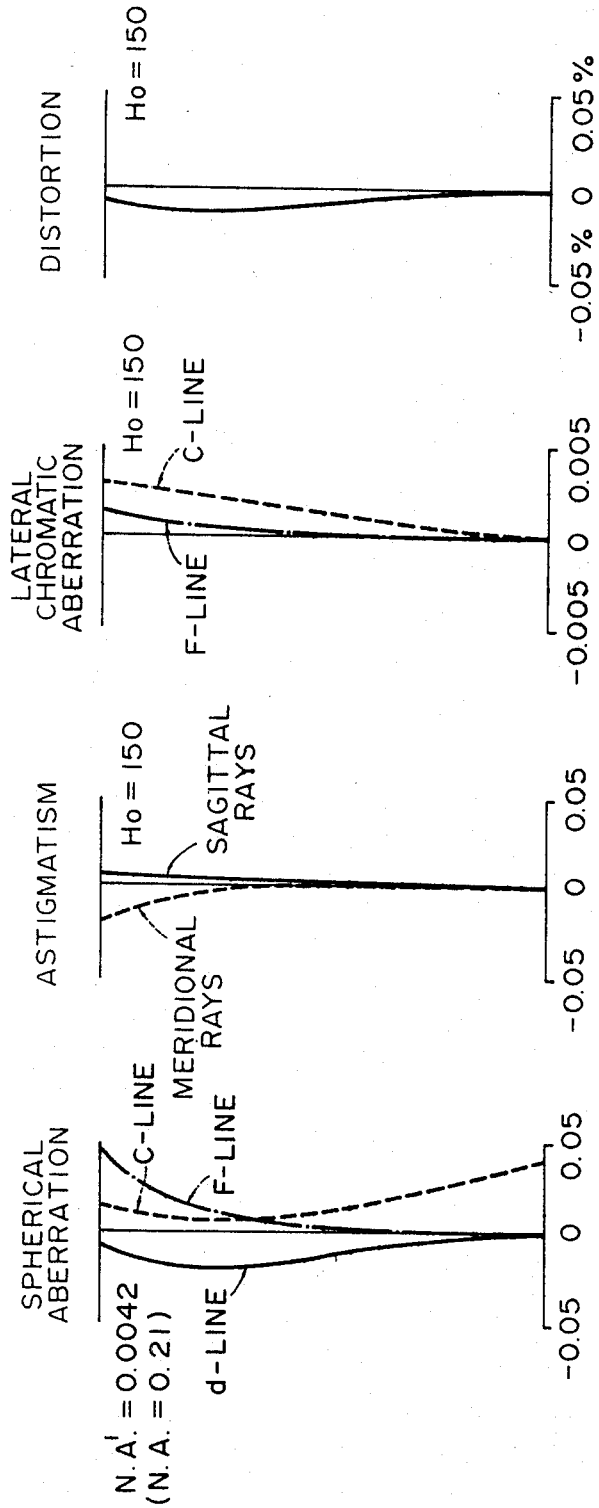
FIG. 7 is an aberration chart of the third embodiment shown in FIG. 3.
Figure 8:
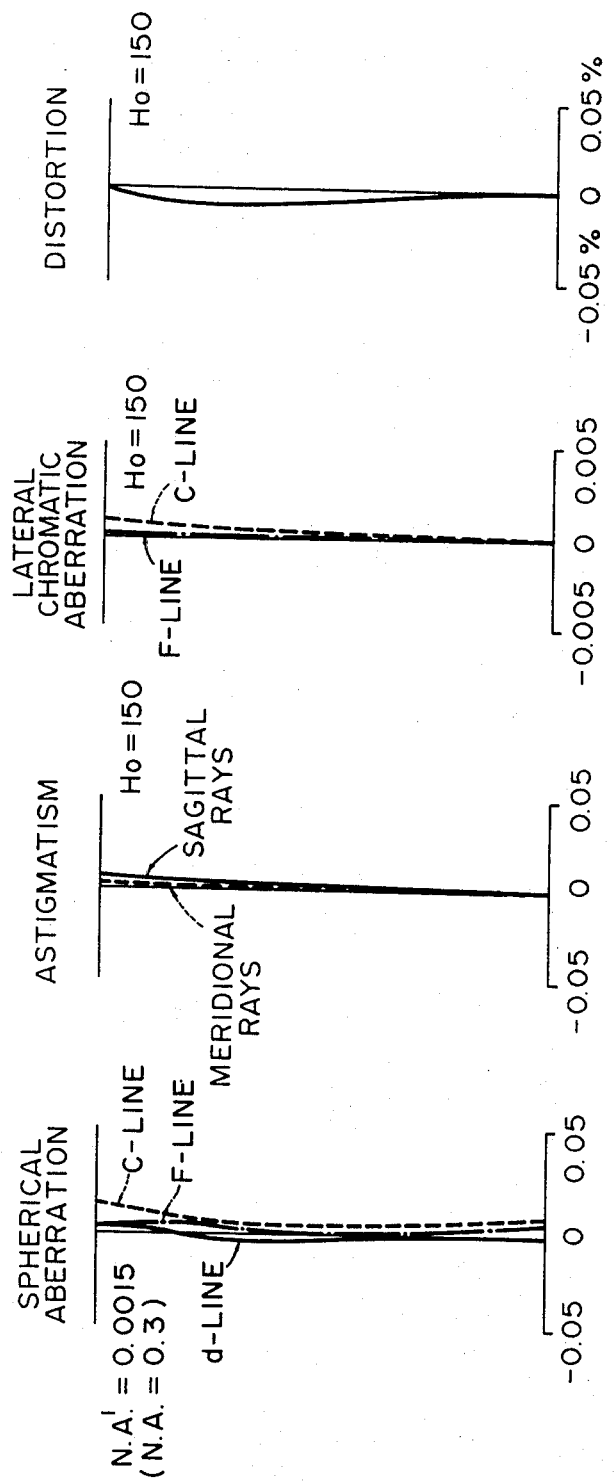
FIG. 8 is an aberration chart of the fourth embodiment shown in FIG. 4.

The Example 4 shown in FIG. 4 has a working distance 4.52 times larger than the focal length, has a total length of 1200 mm and provides a projecting magnification of 200 X. The fifth group G5 is composed substantially similarly to that in the examples 1 and 2. Also the first group is composed of mutually cemented positive and negative lenses constituting a meniscus lens with a convex face toward the image side, wherein said positive and negative lenses have different refractive indexes to compensate for the distortion aberration.

In the foregoing examples, the cemented lenses in the fourth group have a difference in refractive index as large as 0.2, since a larger difference allows the radius of curvature of the cemented face to be increased, thus facilitating the lens production. In practice such difference provides correction by satisfying the condition (3).

In the following, given are numerical parameters of the foregoing examples, wherein $r_1$ to $r_{16}$ are radii of curvature of lens faces counted in succession from the image plane; $d_1$ to $d_{15}$ are lens thicknesses and lens gaps similarly taken from the image plane; $n_1$ to $n_{15}$ are refractive indexes of the lenses; $\nu_1$ to $\nu_{15}$ are Abbe numbers of said lenses; $d_o$ is the distance between the image plane and the first face $r_1$.

EXAMPLE 1

Magnification = 100 ×
Object side N.A. = 0.206
Focal length f = 13.59
Working distance (= W.D.) = 73.06 = 5.38 f
Total length = 1560

| | | | |
|---|---|---|---|
| | $d_0 = 1315.0$ | | |
| $r_1 = 53.540$ | $d_1 = 3.0$ | $n_1 = 1.7847$ | $\nu_1 = 26.1$ |
| $r_2 = -101.800$ | $d_2 = 0.1$ | | |
| $r_3 = -143.470$ | $d_3 = 1.6$ | $n_3 = 1.74443$ | $\nu_3 = 49.4$ |
| $r_4 = 27.352$ | $d_4 = 38.9$ | | |
| $r_5 = 87.082$ | $d_5 = 2.0$ | $n_5 = 1.713$ | $\nu_5 = 53.9$ |
| $r_6 = 17.100$ | $d_6 = 69.0$ | | |
| $r_7 = -150.000$ | $d_7 = 7.8$ | $n_7 = 1.62041$ | $\nu_7 = 60.3$ |
| $r_8 = -42.712$ | $d_8 = 9.3$ | | |
| $r_9 = -173.300$ | $d_9 = 3.7$ | $n_9 = 1.717$ | $\nu_9 = 47.9$ |
| $r_{10} = 49.100$ | $d_{10} = 10.2$ | $n_{10} = 1.50032$ | $\nu_{10} = 81.9$ |

-continued

Magnification = 100 ×
Object side N.A. = 0.206
Focal length f = 13.59
Working distance (= W.D.) = 73.06 = 5.38 f
Total length = 1560

| | | | |
|---|---|---|---|
| $r_{11} = -66.196$ | $d_{11} = 10.6$ | | |
| $r_{12} = 247.142$ | $d_{12} = 6.5$ | $n_{12} = 1.50032$ | $\nu_{12} = 81.9$ |
| $r_{13} = -37.074$ | $d_{13} = 2.2$ | $n_{13} = 1.7495$ | $\nu_{13} = 35.1$ |
| $r_{14} = -204.653$ | $d_{14} = 1.6$ | | |
| $r_{15} = 57.900$ | $d_{15} = 5.3$ | $n_{15} = 1.62374$ | $\nu_{15} = 47.0$ |
| $r_{16} = -180.684$ | | | |

$f_1 = -111.94$, $(r_8 + r_7)/(r_8 - r_7) = -1.80$
$f_2 = -30.2$
$f_3 = 93.65$, $|F_{12}| = 19.03$

EXAMPLE 2

Magnification = 50 ×
Object side N.A. = 0.205
Focal length f = 27.19
W.D. = 82.96 = 3.05 f
Total length = 1543.7

| | $d_0 = 1322.0$ | | |
|---|---|---|---|
| $r_1 = 52.700$ | $d_1 = 4.0$ | $n_1 = 1.7847$ | $\nu_1 = 26.1$ |
| $r_2 = -354.950$ | $d_2 = 0.2$ | | |
| $r_3 = 217.809$ | $d_3 = 2.5$ | $n_3 = 1.717$ | $\nu_3 = 47.9$ |
| $r_4 = 22.360$ | $d_4 = 14.7$ | | |
| $r_5 = 42.070$ | $d_5 = 3.0$ | $n_5 = 1.6779$ | $\nu_5 = 55.5$ |
| $r_6 = 21.047$ | $d_6 = 65.1$ | | |
| $r_7 = -130.413$ | $d_7 = 6.3$ | $n_7 = 1.62041$ | $\nu_7 = 60.3$ |
| $r_8 = -42.400$ | $d_8 = 10.0$ | | |
| $r_9 = -173.840$ | $d_9 = 4.0$ | $n_9 = 1.744$ | $\nu_9 = 44.9$ |
| $r_{10} = 50.250$ | $d_{10} = 10.0$ | $n_{10} = 1.50032$ | $\nu_{10} = 81.9$ |
| $r_{11} = -67.380$ | $d_{11} = 3.0$ | | |
| $r_{12} = 311.420$ | $d_{12} = 7.5$ | $n_{12} = 1.50032$ | $\nu_{12} = 81.9$ |
| $r_{13} = -40.393$ | $d_{13} = 2.4$ | $n_{13} = 1.744$ | $\nu_{13} = 44.9$ |
| $r_{14} = -242.51$ | $d_{14} = 0.8$ | | |
| $r_{15} = 74.129$ | $d_{15} = 5.2$ | $n_{15} = 1.62041$ | $\nu_{15} = 60.3$ |
| $r_{16} = -123.061$ | | | |

$f_1 = -102.61$, $(r_8 + r_7)/(r_8 - r_7) = -1.96$
$f_2 = -65.93$
$f_3 = 98.56$, $|F_{12}| = 37.53$

EXAMPLE 3

Magnification = 50 ×
Object side N.A. = 0.207
Focal length f = 21.02
W.D. = 63.76 = 3.03 f
Total length = 1200

| | $d_0 = 1015.55$ | | |
|---|---|---|---|
| $r_1 = 49.68$ | $d_1 = 3.5$ | $n_1 = 1.7847$ | $\nu_1 = 26.1$ |
| $r_2 = -197.026$ | $d_2 = 0.7$ | | |
| $r_3 = 485.158$ | $d_3 = 2.1$ | $n_3 = 1.77279$ | $\nu_3 = 49.4$ |
| $r_4 = 23.550$ | $d_4 = 14.7$ | | |
| $r_5 = 33.970$ | $d_5 = 2.7$ | $n_5 = 1.67025$ | $\nu_5 = 57.5$ |
| $r_6 = 15.750$ | $d_6 = 59.8$ | | |
| $r_7 = -85.150$ | $d_7 = 5.0$ | $n_7 = 1.6228$ | $\nu_7 = 56.9$ |
| $r_8 = -34.630$ | $d_8 = 8.3$ | | |
| $r_9 = 500.000$ | $d_9 = 3.1$ | $n_9 = 1.75692$ | $\nu_9 = 31.7$ |
| $r_{10} = 34.24$ | $d_{10} = 6.5$ | $n_{10} = 1.50032$ | $\nu_{10} = 81.9$ |
| $r_{11} = -67.459$ | $d_{11} = 10.7$ | | |
| $r_{12} = 38.000$ | $d_{12} = 3.6$ | $n_{12} = 1.62041$ | $\nu_{12} = 60.3$ |
| $r_{13} = 167.537$ | | | |

$f_1 = -107.22$, $(r_8 + r_7)/(r_8 - r_7) = -2.37$
$f_2 = -46.58$
$f_3 = 90.3$, $|F_{12}| = 30.46$

EXAMPLE 4

Magnification = 200 ×
Object side N.A. = 0.30
Focal length f = 5.61
W.D. = 25.36 = 4.52 f

| | $d_0 = 1101.6$ | | |
|---|---|---|---|
| $r_1 = 41.904$ | $d_1 = 1.7$ | $n_1 = 1.79504$ | $\nu_1 = 28.6$ |
| $r_3 = -26.266$ | $d_3 = 0.8$ | $n_3 = 1.56883$ | $\nu_3 = 56.0$ |
| $r_4 = 11.644$ | $d_4 = 16.0$ | | |
| $r_5 = 30.820$ | $d_5 = 0.9$ | $n_5 = 1.713$ | $\nu_5 = 54.0$ |
| $r_6 = 7.114$ | $d_6 = 27.0$ | | |
| $r_7 = -62.100$ | $d_7 = 3.3$ | $n_7 = 1.62299$ | $\nu_7 = 58.2$ |
| $r_8 = -18.097$ | $d_8 = 3.8$ | | |
| $r_9 = -103.000$ | $d_9 = 1.6$ | $n_9 = 1.744$ | $\nu_9 = 45.1$ |
| $r_{10} = 25.100$ | $d_{10} = 4.3$ | $n_{10} = 1.49782$ | $\nu_{10} = 82.3$ |
| $r_{11} = -25.100$ | $d_{11} = 4.4$ | | |
| $r_{12} = 101.566$ | $d_{12} = 4.0$ | $n_{12} = 1.49782$ | $\nu_{12} = 82.3$ |
| $r_{13} = -15.900$ | $d_{13} = 1.0$ | $n_{13} = 1.7495$ | $\nu_{13} = 35.2$ |
| $r_{14} = -83.967$ | $d_{14} = 0.7$ | | |
| $r_{15} = 22.000$ | $d_{15} = 3.5$ | $n_{15} = 1.6935$ | $\nu_{15} = 53.8$ |
| $r_{16} = -229.639$ | | | |

$f_1 = -50.35$, $(r_8 + r_7)/(r_8 - r_7) = -1.82$
$f_2 = -13.18$
$f_3 = 39.86$, $|F_{12}| = 8.43$

The aberrations of the foregoing examples are respectively shown in FIGS. 5, 6, 7 and 8, wherein the optical path is tracked from the image side to the object side, and NA', NA and Ho respectively stand for the numerical aperture at the image side, the numerical aperature at the object side, and the image height. It will be observed from these charts that these examples afford satisfactory correction of the aberrations in spite of high image magnifications and extremely long working distances.

As explained in the foregoing, the present invention, providing a long working distance, to significantly improve the manipulability of high-magnification lenses. In horizontal projectors for observing large objects the relay lens system often employed for extending the working distance inevitably increases the production cost and deteriorates the performance, but the projection lens of the present invention provides a practical working distance without the relay lens, thus simplifying the structure, and is extremely advantageous in cost and performance.

I claim:

1. A projection lens system with a working distance two or more times longer than the focal length of the total system for projecting a magnified image of an object, comprising in order from the image side:
    diverging first lens means including a positive lens element and a negative lens element;
    diverging second lens means including a negative meniscus lens element with a convex surface thereof facing toward the image side;
    converging third lens means including a positive meniscus lens element with a concave surface thereof facing toward the image side;
    converging fourth lens means including a positive lens composed of a mutually cemented negative lens element and a positive lens element; and
    converging fifth lens means.

2. A projection lens system according to claim 1, satisfying the following conditions:

$$0.6\,K < f_3 < 1.3\,K \quad (1)$$

wherein $K = |F_{12}| + d_6$ $-3.5 < (r_8 + r_7)/(r_8 - r_7) < -0.8$ (2)

$0.4 > n_9 - n_{10} > 0.1$ (3)

$|f_1| > |f_2|$ (4)

wherrein $f_1, f_2, f_3$: focal lengths of said first, second and third lens means, respectively, $F_{12}$: composite focal length of said first and second lens means, $d_6$: air gap between said second and third lens means, $n_9, n_{10}$: refractive indexes, respectively, of the negative and positive lens elements in said fourth lens means, and $r_7, r_8$: radii of curvature, respectively, of the faces at the image side and the object side of the positive meniscus lens in said third lens means.

3. A projection lens system according to claim 1 or 2, wherein the negative lens element and the positive lens element in said fourth lens means are mutually cemented with a cemented convex surface facing toward the image side, and the negative lens element is disposed at the image side of the positive lens element.

4. A projection lens system according to claim 3, wherein said fifth lens means comprises in the order from the image side a positive lens composed of mutually cemented positive and negative lens elements, and a single positive lens element.

5. A projection lens system according to claim 4, comprising the numerical parameters:

Magnification = 100 ×
Object side N.A. = 0.206
Focal length f = 13.59
W.D. = 73.06 = 5.38 f
Total length = 1560

| | $d_0 = 1315.0$ | | |
|---|---|---|---|
| $r_1 = 53.540$ | $d_1 = 3.0$ | $n_1 = 1.7847$ | $\nu_1 = 26.1$ |
| $r_2 = -101.800$ | $d_2 = 0.1$ | | |
| $r_3 = -143.470$ | $d_3 = 1.6$ | $n_3 = 1.74443$ | $\nu_3 = 49.4$ |
| $r_4 = 27.352$ | $d_4 = 38.9$ | | |
| $r_5 = 87.082$ | $d_5 = 2.0$ | $n_5 = 1.713$ | $\nu_5 = 53.9$ |
| $r_6 = 17.100$ | $d_6 = 69.0$ | | |
| $r_7 = -150.000$ | $d_7 = 7.8$ | $n_7 = 1.62041$ | $\nu_7 = 60.3$ |
| $r_8 = -42.712$ | $d_8 = 9.3$ | | |
| $r_9 = -173.300$ | $d_9 = 3.7$ | $n_9 = 1.717$ | $\nu_9 = 47.9$ |
| $r_{10} = 49.100$ | $d_{10} = 10.2$ | $n_{10} = 1.50032$ | $\nu_{10} = 81.9$ |
| $r_{11} = -66.196$ | $d_{11} = 10.6$ | | |
| $r_{12} = 247.142$ | $d_{12} = 6.5$ | $n_{12} = 1.50032$ | $\nu_{12} = 81.9$ |
| $r_{13} = -37.074$ | $d_{13} = 2.2$ | $n_{13} = 1.7495$ | $\nu_{13} = 35.1$ |
| $r_{14} = -204.653$ | $d_{14} = 1.6$ | | |
| $r_{15} = 57.900$ | $d_{15} = 5.3$ | $n_{15} = 1.62374$ | $\nu_{15} = 47.0$ |
| $r_{16} = -180.684$ | | | |

$f_1 = -111.94, (r_8 + r_7)/(r_8 - r_7) = -1.80$
$f_2 = -30.2$
$f_3 = 93.65, |F_{12}| = 19.03$ wherein $r_1$ to $r_{16}$ are radii of curvature of lens faces counted from the image side; $d_1$ to $d_{15}$ are lens thicknesses and lens gaps similarly counted from the image side; $n_1$ to $n_{15}$ are refractive indexes of the lenses; $\nu_1$ to $\nu_{15}$ are Abbe numbers of said lenses; and $d_o$ is the distance between the image plane and the first face $r_1$.

6. A projection lens system according to claim 4, comprising the numerical parameters:

Magnification = 50 ×
Object side N.A. = 0.205
Focal length f = 27.19
W.D. = 82.96 = 3.05 f
Total length = 1543.7

| | $d_0 = 1322.0$ | | |
|---|---|---|---|
| $r_1 = 52.700$ | $d_1 = 4.0$ | $n_1 = 1.7847$ | $\nu_1 = 26.1$ |
| $r_2 = -354.950$ | $d_2 = 0.2$ | | |
| $r_3 = 217.809$ | $d_3 = 2.5$ | $n_3 = 1.717$ | $\nu_3 = 47.9$ |
| $r_4 = 22.360$ | $d_4 = 14.7$ | | |
| $r_5 = 42.070$ | $d_5 = 3.0$ | $n_5 = 1.6779$ | $\nu_5 = 55.5$ |
| $r_6 = 21.047$ | $d_6 = 65.1$ | | |
| $r_7 = -130.413$ | $d_7 = 6.3$ | $n_7 = 1.62041$ | $\nu_7 = 60.3$ |
| $r_8 = -42.400$ | $d_8 = 10.0$ | | |
| $r_9 = -173.840$ | $d_9 = 4.0$ | $n_9 = 1.744$ | $\nu_9 = 44.9$ |
| $r_{10} = 50.250$ | $d_{10} = 10.0$ | $n_{10} = 1.50032$ | $\nu_{10} = 81.9$ |
| $r_{11} = -67.380$ | $d_{11} = 3.0$ | | |
| $r_{12} = 311.420$ | $d_{12} = 7.5$ | $n_{12} = 1.50032$ | $\nu_{12} = 81.9$ |
| $r_{13} = -40.393$ | $d_{13} = 2.4$ | $n_{13} = 1.744$ | $\nu_{13} = 44.9$ |
| $r_{14} = -242.51$ | $d_{14} = 0.8$ | | |
| $r_{15} = 74.129$ | $d_{15} = 5.2$ | $n_{15} = 1.62041$ | $\nu_{15} = 60.3$ |
| $r_{16} = -123.061$ | | | |

$f_1 = -102.61, (r_8 + r_7)/(r_8 - r_7) = -1.96$
$f_2 = -65.93$
$f_3 = 98.56, |F_{12}| = 37.53$ wherein $r_1$ to $r_{16}$ are radii of curvature of lens faces counted from the image side; $d_1$ to $d_{15}$ are lens thicknesses and lens gaps similarly counted from the image side; $n_1$ to $n_{15}$ are refractive indexes of the lenses; $\nu_1$ to $\nu_{15}$ are Abbe numbers of said lenses; and $d_o$ is the distance between the image plane and the first face $r_1$.

7. A projection lens system according to claim 3, wherein said fifth lens means comprises a single positive lens element.

8. A projection lens system according to claim 7, comprising the numerical parameters:

Magnification = 50 ×
Object side N.A. = 0.207
Focal length f = 21.02
W.D. = 63.76 = 3.03 f
Total length = 1200

| | $d_0 = 1015.55$ | | |
|---|---|---|---|
| $r_1 = 49.68$ | $d_1 = 3.5$ | $n_1 = 1.7847$ | $\nu_1 = 26.1$ |
| $r_2 = -196.026$ | $d_2 = 0.7$ | | |
| $r_3 = 485.158$ | $d_3 = 2.1$ | $n_3 = 1.77279$ | $\nu_3 = 49.4$ |
| $r_4 = 23.550$ | $d_4 = 14.7$ | | |
| $r_5 = 33.970$ | $d_5 = 2.7$ | $n_5 = 1.67025$ | $\nu_5 = 57.5$ |
| $r_6 = 15.750$ | $d_6 = 59.8$ | | |
| $r_7 = -85.150$ | $d_7 = 5.0$ | $n_7 = 1.6228$ | $\nu_7 = 56.9$ |
| $r_8 = -34.630$ | $d_8 = 8.3$ | | |
| $r_9 = 500.000$ | $d_9 = 3.1$ | $n_9 = 1.75692$ | $\nu_9 = 31.7$ |
| $r_{10} = 34.24$ | $d_{10} = 6.5$ | $n_{10} = 1.50032$ | $\nu_{10} = 81.9$ |
| $r_{11} = -67.459$ | $d_{11} = 10.7$ | | |
| $r_{12} = 38.000$ | $d_{12} = 3.6$ | $n_{12} = 1.62041$ | $\nu_{12} = 60.3$ |
| $r_{13} = 167.537$ | | | |

$f_1 = -107.22, (r_8 + r_7)/(r_8 - r_7) = -2.37$
$f_2 = -46.58$
$f_3 = 90.3, |F_{12}| = 30.46$ wherein $r_1$ to $r_{13}$ are radii of curvature of lens faces counted from the image side; $d_1$ to $d_{12}$ are lens thicknesses and lens gaps similarly counted from the image side; $n_1$ to $n_{12}$ are refractive indexes of the lenses; $\nu_1$ to $\nu_{12}$ are Abbe numbers of said lenses; and $d_o$ is the distance between the image plane and the first face $r_1$.

9. A projection lens system according to claim 3, wherein the positive and negative lens element in said first lens means are mutually cemented with an adhering face concave to the image side.

10. A projection lens system according to claim 9, comprising the numerical parameters:

|  | Magnification: 200 × | | |
|---|---|---|---|
|  | Object side N.A. = 0.30 | | |
|  | Focal length f = 5.61 | | |
|  | W.D. = 25.36 = 4.52 f | | |
|  | $d_0 = 1101.6$ | | |
| $r_1 = 41.904$ | $d_1 = 1.7$ | $n_1 = 1.79504$ | $\nu_1 = 28.6$ |
| $r_3 = -26.266$ | $d_3 = 0.8$ | $n_3 = 1.56883$ | $\nu_3 = 56.0$ |
| $r_4 = 11.644$ | $d_4 = 16.0$ | | |
| $r_5 = 30.820$ | $d_5 = 0.9$ | $n_5 = 1.713$ | $\nu_5 = 54.0$ |
| $r_6 = 7.114$ | $d_6 = 27.0$ | | |
| $r_7 = -62.100$ | $d_7 = 3.3$ | $n_7 = 1.62299$ | $\nu_7 = 58.2$ |
| $r_8 = -18.097$ | $d_8 = 3.8$ | | |
| $r_9 = -103.000$ | $d_9 = 1.6$ | $n_9 = 1.744$ | $\nu_9 = 45.1$ |
| $r_{10} = 25.100$ | $d_{10} = 4.3$ | $n_{10} = 1.49782$ | $\nu_{10} = 82.3$ |
| $r_{11} = -25.100$ | $d_{11} = 4.4$ | | |
| $r_{12} = 101.566$ | $d_{12} = 4.0$ | $n_{12} = 1.49782$ | $\nu_{12} = 82.3$ |
| $r_{13} = -15.900$ | $d_{13} = 1.0$ | $n_{13} = 1.7495$ | $\nu_{13} = 35.2$ |
| $r_{14} = -83.967$ | $d_{14} = 0.7$ | | |
| $r_{15} = 22.000$ | $d_{15} = 3.5$ | $n_{15} = 1.6935$ | $\nu_{15} = 53.8$ |
| $r_{16} = -229.639$ | | | |

$$f_1 = -50.35, (r_8 + r_7)/(r_8 - r_7) = -1.82$$
$$f_2 = -13.18$$
$$f_3 = 39.86, |F_{12}| = 8.43$$

wherein $r_1$ to $r_{16}$ are radii of curvature of lens faces counted from the image side; $d_1$ to $d_{15}$ are lens thicknesses and lens gaps similarly counted from the image side; $n_1$ to $n_{15}$ are refractive indexes of the lenses; $\nu_1$ to $\nu_{15}$ are Abbe numbers of said lenses; and $d_o$ is the distance between the image plane and the first face $r_1$.

11. A projection lens system according to claim 1, wherein said diverging first lens means has said positive lens element at a position most adjacent to the image side.

12. A projection lens system according to claim 11, wherein, in said converging fourth lens means, said positive lens composed of the negative lens element mutually cemented to the positive lens element has said negative lens element at a position which is more adjacent to the image side than that of said positive lens element.

13. A projection lens system according to claim 12, wherein said diverging first lens means and said diverging second lens means define a large air space therebetween that is smaller than an air space defined between said diverging second lens means and said converging third lens means.

14. A projection lens system with a working distance of two or more times longer than the focal length of the total system comprising, in order from the image side:
first lens means of negative refractive power including a positive lens component and a negative lens component;
second lens means including a negative meniscus lens component convex toward the image side; and
further lens means of positive refractive power including at least three positive lens components;
said second lens means being disposed between said first lens means and said further lens means so as to define air spaces therebetween that are much larger than the thickness of the negative meniscus lens component.

15. A projection lens system according to claim 14, wherein said first lens means has said positive lens component at a position most adjacent to the image side.

16. A projection lens system according to claim 15, wherein said positive lens component and said negative lens component in said first lens means satisfy the following condition:

$$50 > \nu_3 - \nu_1 > 15$$

where $\nu_1$ and $\nu_3$ are the Abbe numbers of said positive lens component and said negative lens component, respectively.

17. A projection lens system according to claim 16, wherein said positive lens component and said negative lens component in said first lens means further satisfy the following condition:

$$n_1 > n_3$$

where $n_1$ and $n_3$ are the refractive indexes of said positive lens component and said negative lens component, respectively.

18. A projection lens system according to claim 14, wherein one of the positive lens components of said further lens means comprises a doublet positive lens component disposed between the other two positive lens components, said doublet positive lens component having a negative lens at the image side and a positive lens at the object side cemented to said negative lens.

19. A projection lens system according to claim 18, wherein said negative lens and said positive lens in said further lens means satisfy the following condition:

$$0.4 > n_9 - n_{10} > 0.1$$

where $n_9$ and $n_{10}$ are the refractive indexes of said negative lens and said positive lens, respectively.

20. A projection lens system according to claim 14, wherein the air space defined between said negative meniscus lens component and said further lens means is larger than the air space defined between said first lens means and said negative meniscus lens component.

* * * * *